US007865758B2

United States Patent
Swaney et al.

(10) Patent No.: US 7,865,758 B2
(45) Date of Patent: *Jan. 4, 2011

(54) FAULT TOLERANT TIME SYNCHRONIZATION MECHANISM IN A SCALEABLE MULTI-PROCESSOR COMPUTER

(75) Inventors: Scott Barnett Swaney, Catskill, NY (US); Kenneth Lundy Ward, Austin, TX (US); Tobias Webel, Schwaebisch-Gmuend (DE); Ulrich Weiss, Holzgerlingen (DE); Matthias Woehrle, Boeblingen (GR)

(73) Assignee: International Business Machines Corporation, Armonk, NY (US)

( * ) Notice: Subject to any disclaimer, the term of this patent is extended or adjusted under 35 U.S.C. 154(b) by 143 days.

This patent is subject to a terminal disclaimer.

(21) Appl. No.: 12/140,028

(22) Filed: Jun. 16, 2008

(65) Prior Publication Data

US 2008/0244300 A1 Oct. 2, 2008

Related U.S. Application Data

(62) Division of application No. 11/054,294, filed on Feb. 9, 2005, now Pat. No. 7,487,377.

(51) Int. Cl.
*G06F 1/12* (2006.01)
(52) U.S. Cl. .................. 713/500; 713/400; 713/401
(58) Field of Classification Search .............. 713/375, 713/400, 401
See application file for complete search history.

(56) References Cited

U.S. PATENT DOCUMENTS

| 5,146,585 A | 9/1992 | Smith, III | |
|---|---|---|---|
| 5,327,468 A * | 7/1994 | Edblad et al. | 375/356 |
| 2003/0133451 A1 * | 7/2003 | Mahalingaiah | 370/389 |

* cited by examiner

*Primary Examiner*—Nitin C Patel
(74) *Attorney, Agent, or Firm*—Yee & Associates, P.C.; Diana R. Gerhardt

(57) ABSTRACT

Redundant time-of-day (TOD) oscillators are aligned, within a master oscillator path, to local logic oscillator and used to create independent step-sync signals. A step checker validates and provides selection signals to identify which of the TOD oscillators operates according to a criterion. Independent step-sync signals are transmitted to several sibling chips. Local step and sync signals are delayed to arrive at TOD register nearly synchronous with TOD registers in sibling chips. A slave oscillator path may be used to select time signals generated in a sibling chip, whereby the master oscillator path is deselected. A primary control register set may be used to configure which among several chips is a master chip using the master oscillator path. All remaining chips are slave chips. All segments of the topology are redundant. One of multiple possible alternate topologies is defined in a secondary control register set. Commands and TOD values are passed on the fabric at predefined time increment boundaries to establish, restore, or maintain synchronization across all chips.

8 Claims, 8 Drawing Sheets

FAULT TOLERANT TIME SYNCHRONIZATION MECHANISM IN A SCALEABLE MULTI-PROCESSOR COMPUTER

This application is a divisional of application number 11/054,294, filed Feb. 9, 2005, status pending.

BACKGROUND OF THE INVENTION

1. Technical Field

The invention relates to the field of multiprocessor systems, and more specifically to the field of aligning timing signals among processors to achieve time-synchronous operation.

2. Description of Related Art

Time is important for managing the available processing resources. The number of active tasks or programs in a large SMP system may exceed the total number of hardware threads across all the processors in the system, which means not all of the programs can execute at the same time. The operating system may allocate portions of time to different sets of tasks or programs, with different durations (time slices) allocated to different tasks depending on the priority and resources required for each task. A hypervisor may partition various processor resources such that the operating system may only directly control or be affected by certain processors and memory of a SMP system. Thus the hypervisor may assist in allocating time resources as well providing various error correcting routines.

A timebase (TB) Register is used to represent time in a processor or core. The TB register is a free-running 64-bit register that increments at a constant rate so that its value can be converted to time. The TB registers are synchronized across all processors in an SMP system so that all processors in the system have the same representation of time. The TB register is a shared resource across all threads in a multi-threaded processor, and the constant rate that it increments is known to software executing on each thread. Software calculates time by multiplying the TB register value by the known incrementing rate, and adding the result to a known time offset.

In prior designs, the processor clock frequency was a known constant, so the TB register could simply increment every 'n' processor cycles, where 'n' is set depending on the desired granularity of time increment. For example, at a processor frequency of 1.0 GHz, with n=8, a TB register value of '000000001234ABCD'x represents 2.4435 seconds.

However, it is desirable to construct a multiprocessor from smaller processing building blocks, i.e. nodes, wherein each is able to act as a complete stand-alone computer, including a time-of-day clock.

However, it becomes increasingly unmanageable to extend a single clock as architectures continue to scale to larger collections of processing nodes. More importantly, a centralized clock or oscillator represents a single point of failure that can idle a very expensive multiprocessor environment.

A possible solution is to have separate timing clocks for disparate collections of nodes. Such architecture allows scalability on increments of one node, and avoids the overhead of infrastructure costs in small configurations. Separate nodes can be interconnected via a board or cables as well as coherency protocols on the system bus fabric between nodes, as may carried by various boards or cables. The nodes may each be asynchronous to allow slight differences in frequency between clocks that run each of them. However, a means to correct for an oscillator that is one cycle ahead of the others is necessary to meet a requirement that all processors see the same time, and that time is always increasing.

One significant limitation in known redundant clock distribution signaling is that the redundant clock often travels along the same distribution network as the primary clock signal or at least of similar conductor lengths, where same distribution network is common to all chips in the system. Such is evident from prior art methods wherein a register in each of four time of day (TOD) clock sources is incremented by a high frequency signal to achieve a TOD value resolution, which comes form a frequency-multiplied lower reference frequency signal for synchronization of the clock sources.

Unfortunately current technique lacks a reconfigurable distribution network to address the needs of modern highly scalable microprocessor networks. Further because the current technique has no distribution network of varying conductor lengths and paths, the current technique fails to compensate for timing delays that occur at end-nodes to a timing distribution networks. More specifically, since the current technique requires a common precise time reference to be distributed to all TOD register logic in the system, with the amount of skew small relative to the reference period, it does not allow combining of multiple separate processing building blocks (nodes) which can act as stand-alone computers into a single symmetric multi-processor (SMP).

Therefore, it would be advantageous to have a network to select from among two oscillators available in a large, multi-node multiprocessor configuration, where each node may also be capable of operating as a stand-alone computer with its own reference oscillator. It is also advantageous to support multiple different configurations with variable propagation delays between processing nodes and large skew relative to the reference period while detecting any oscillator that is out-of-specified limits. Moreover, it is advantageous to have redundancy in said network to avoid any single points of failure and to recover from disconnects of conductors that interrupt oscillator or other timing signals originating on another board or chip, by switching over to perhaps a redundant local oscillator, inter-chip or inter-drawer connection.

In addition, it would be advantageous to provide for recovery of parity errors that may occur in registers that store configuration information or store a time-stamp indicating a system time.

It is also desirable to dynamically re-assign the selection of the topology to allow concurrent repair of any processing node in a multi-node configuration.

Less notably, it is desirable to minimize analog circuitry such as phase-locked-loops as used in U.S. Pat. No. 5,146,585.

SUMMARY OF THE INVENTION

It is an object of the present invention to select from among two oscillators to provide a time-of-day (TOD) setting from multiple chips.

It is a further object to support a propagation delay that may vary depending on the configuration selected for the chips in a symmetric multiprocessor system.

It is yet another object to provide for recovery of parity errors that may store configuration information.

A method is shown for distributing a synchronizing time-of-day (TOD) signal from a first chip to many other chips in a symmetrical multiprocessing system consisting of multiple self-contained processing nodes. Two time of day (TOD) oscillators provide at least one valid oscillator signal even in the event of a failure. A designated master chip observes and guarantees signal criterion of the valid oscillator signal, and uses it to generate an immediate time signal. The designated master chip transmits the immediate time signal to each neighboring slave chip, which again forwards to neighboring slave chips. All chips internally delay the immediate time signal to compensate for forwarding propagation delays. The time signal distribution topology is completely redundant, including designation of an alternate-master chip in multi-node configurations. Error detection and recovery mechanisms prevent loss of time synchronization in the event of failures.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
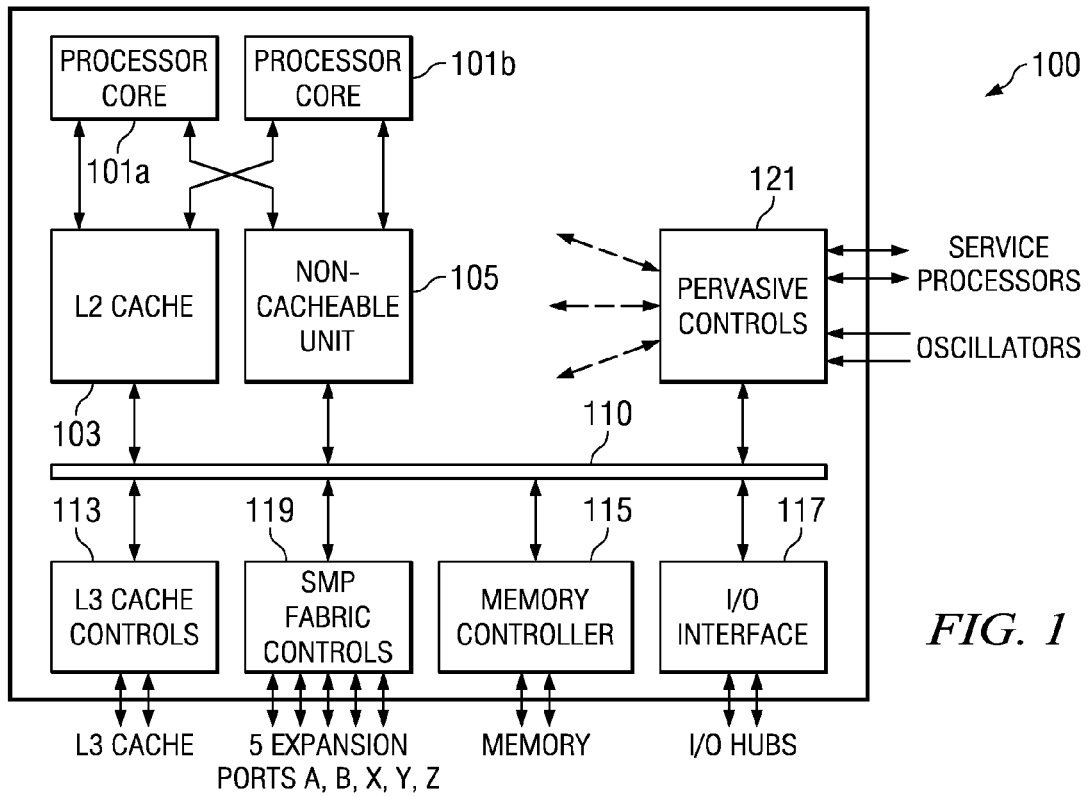
FIG. 1 shows a multi-processor chip of the present invention in block form in accordance with the preferred embodiment of the present invention.

FIG. 1 is a representative microprocessor or chip that may perform the functions of receiving and dispatching timing signals and occasionally recovering when one or more inbound oscillator signals becomes faulty. Chip 100 may have first core processor 101a and second core processor 101b. Each core processor may be simply referred to as a core. A core processor may have multithreading capability, error detection and recovery functions, numerous general purpose registers (GPR) and special purpose registers (SPR).

Connectivity of first core 101a and second core 101b may be with level 2 cache 103 or L2, and the non-cacheable unit 105 or NCU. NCU 105 may handle commands to store data received from a core unto fabric bus 110 for storage to main memory. Such stores may be memory-mapped i/o. Access to memory that may be susceptible to frequent accesses later may be stored to the L2 103 in order to reduce latency of operations performed by a core.

L2 103 may similarly provide access to its contents via fabric bus 110 which may interconnect to other chips on the same board, and also beyond the board upon which chip 100 is placed.

A nearby, but off-chip level 3 cache or L3 may be provided. Controls governing access between the cores and the L3 are in L3 cache control 113. Similarly, memory controller 115, and I/O interface 117 may be provided on-chip to facilitate long-latency access to general RAM and to various peripheral devices, respectively.

Symmetric multi-processor (SMP) fabric controls 119, is a special purpose device that mediates the contention for the fabric bus by the various attached devices, and provides for SMP topology configuration via expansion ports A, B, X, Y and Z. Five expansion ports are shown in the embodiment, however, it is understood that to achieve varying levels of complex multichip topologies, fewer or more expansion ports may be used. It is anticipated that five ports may provide 64 chips with rapid instruction, data and timing signals between and among them.

Pervasive controls 121 are circuits that exist both outside and mingled within the various processing blocks found on chip. Among the functions of pervasive controls is the providing of back-ups to the processor state on each core by providing redundant copies of various GPRs and SPRs of each core at convenient instruction boundaries of the each core processor. In addition pervasive controls may assist in the detection of errors and communication of such errors to an outside service processor for further action by, e.g. firmware.

Pervasive controls 121 are a gating point for redundant oscillators and other circuits which provide or receive derivative timing signals. It is appreciated that a fault, or other condition may remove one or more redundant oscillators from the configuration, and it is an object of the pervasive control to select the better timing signal (or at least one that is within tolerances) from among the redundant oscillators, and step-encoded signals that may arrive via the expansion ports.

Figure 2:
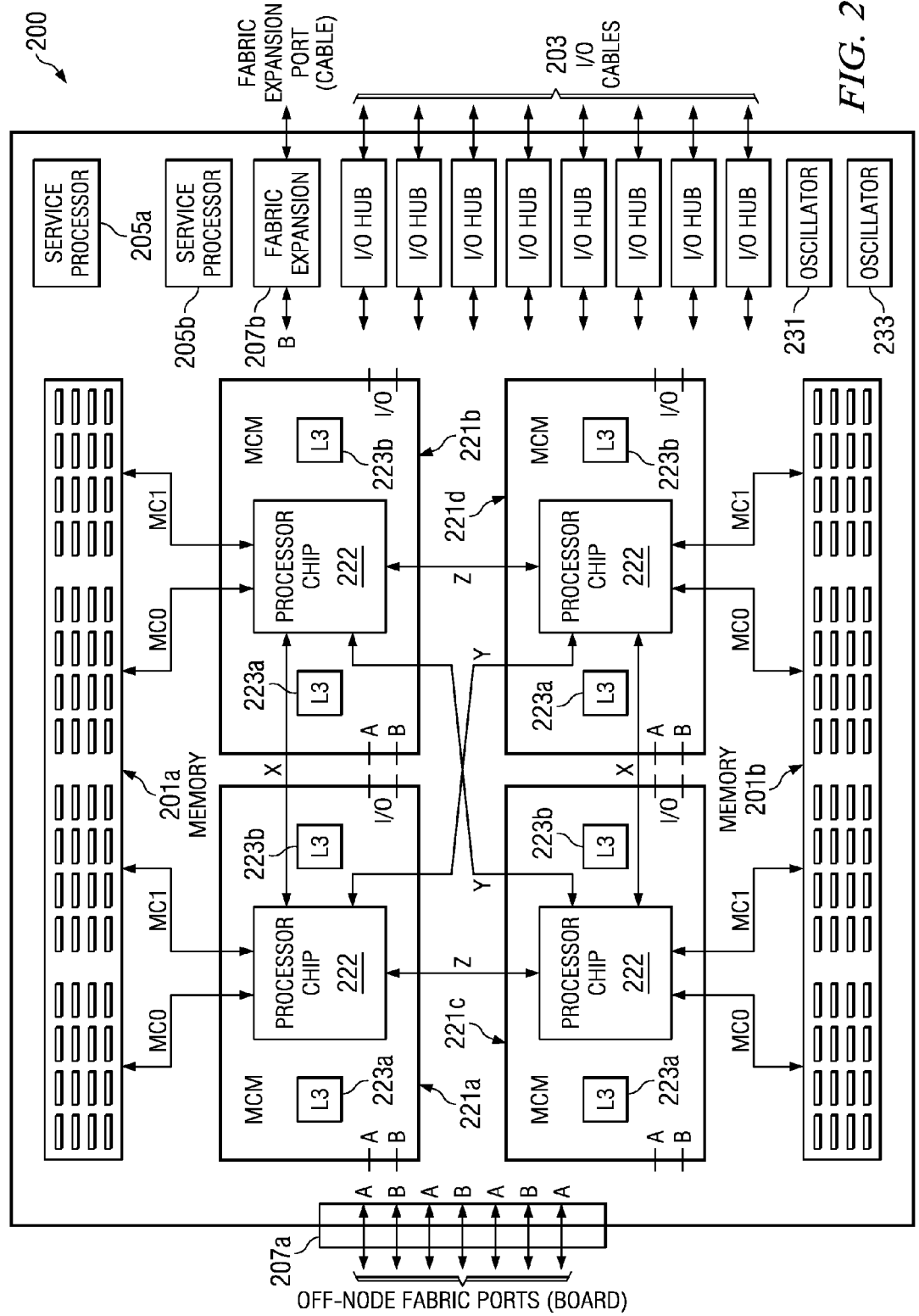
FIG. 2 shows a first embodiment physical configuration of the multi-processor chips in a symmetric multi-processor (SMP) arrangement on a circuit board in accordance with the preferred embodiment of the present invention.

FIG. 2 shows a first embodiment configuration of a symmetric multiprocessor using the chip of FIG. 1 in the form of processor node 200. Processor node 200 may contain memory banks 201a and 201b, I/O hubs 203, service processors 205a and 205b, and ports or connectors 207a and 207b handling the A and B SMP fabric expansion ports from each of multichip modules (MCM) 221a, 221b, 221c, and 221d. SMP fabric expansion ports X, Y, Z interconnect MCMs 221 within node 200, while ports A, B interconnect MCMs across multiple different nodes. Each multichip module may be identical in its hardware configuration, but configured by software to have varying topologies and functions as, e.g. between master and slave functions. Within a MCM may be found chip 222 of FIG. 1, as well as level 3 cache memory 223a and 223b. Processor node 200 may have primary oscillator 231 and secondary oscillator 233 that are each routed to each chip found on the processor node. Connections between the oscillators and functional units extend throughout the board and chips, but are not shown in FIG. 2 in order to limit clutter. Similarly, it is understood that many convoluted interconnects exist between the ports and I/O hubs, among other components—though such interconnects are not shown here.

Figure 3A:
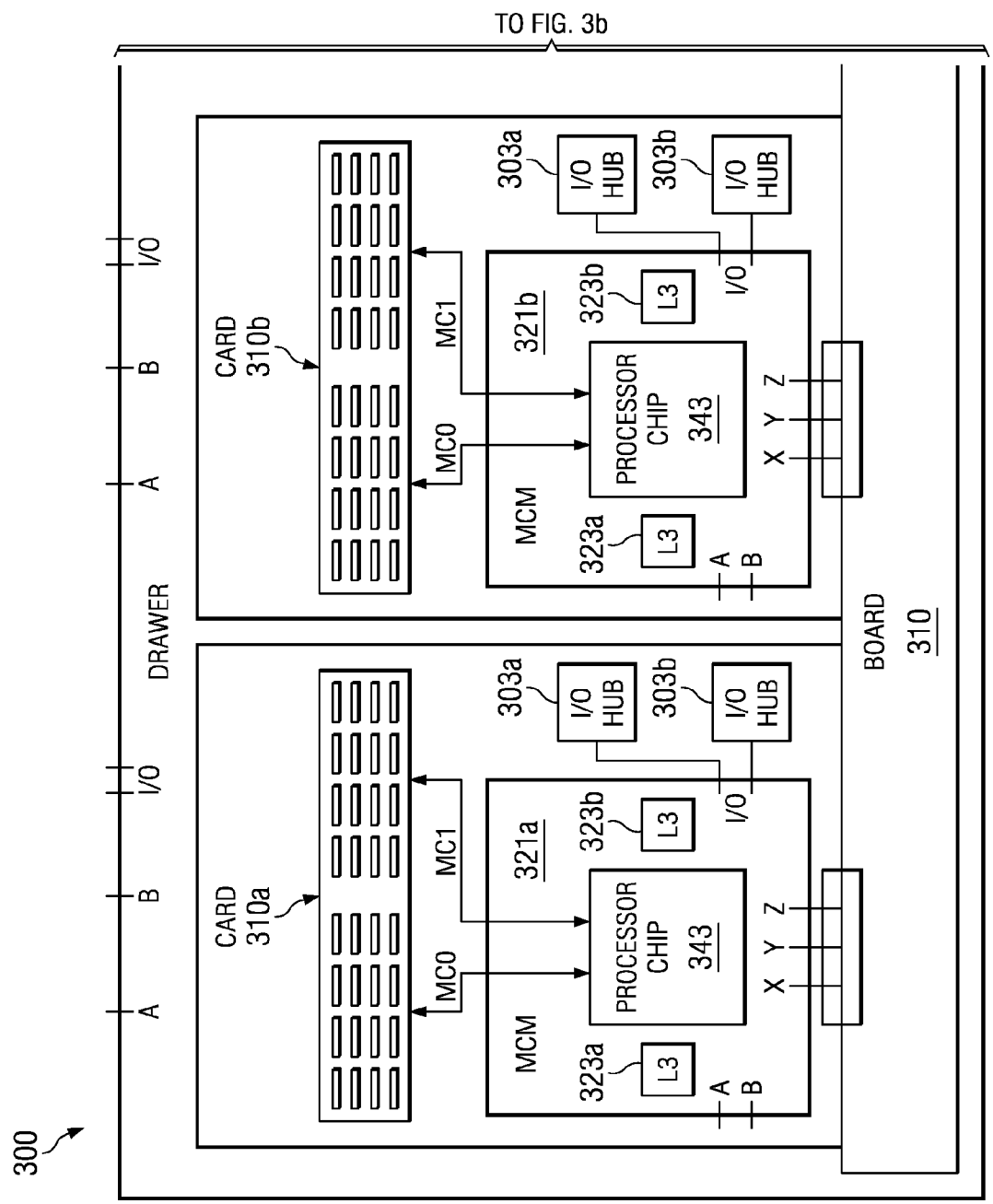
FIG. 3A shows a first half of a second physical configuration of the multi-processor chips in a symmetric multi-processor card and drawer arrangement in accordance with the preferred embodiment of the present invention.
Figure 3B:
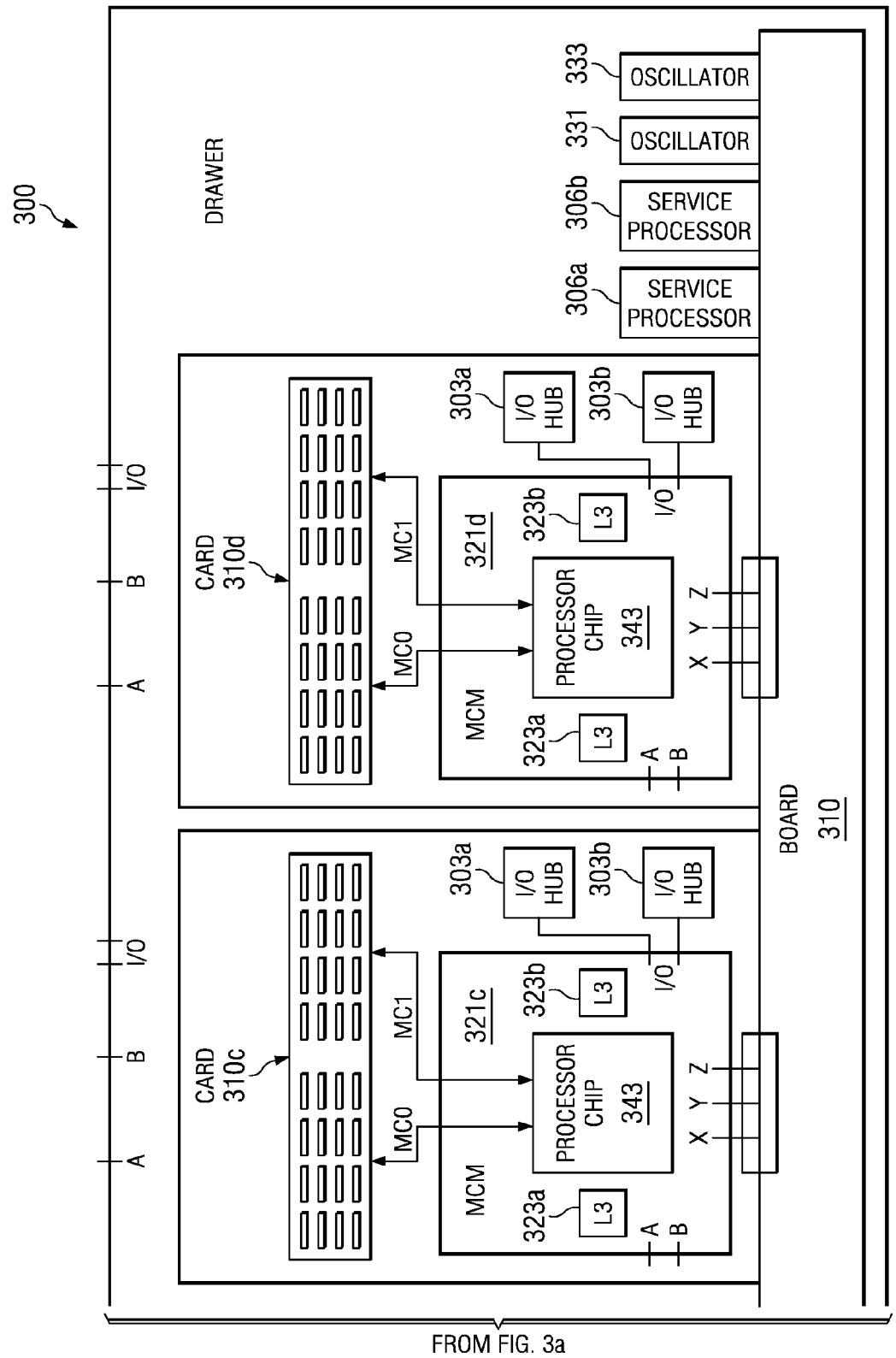
FIG. 3B shows a second half second physical configuration of the multi-processor chips in a symmetric multi-processor card and drawer arrangement in accordance with the preferred embodiment of the present invention.

FIG. 3A and FIG. 3B shows a second embodiment configuration of the symmetric multiprocessor using the chip of FIG. 1 in the form of processor drawer 300. Drawer 300 may place each MCM 321a, 321b, 321c, and 321d on a dedicated card and interconnect among all cards through a board 310. Memory banks are dispersed among the cards 301a, 301b, 301c, and 301d. Like FIG. 2, the MCM of the processor drawer may be identical in hardware configuration but configured by software to have varying topologies and functions within the SMP framework. Within a MCM may be found the chip 343 of FIG. 1, as well as level 3 cache memory 323a and 323b. I/O hubs 303a and 303b may be placed on a card with a MCM. The drawer may provide service processors 306a, 306b for initialization and supervision, as well as primary oscillator 331 and secondary oscillator 333. Service processors and oscillators may interconnect to each card via the board 310.

The drawer configuration and the node configuration—though physically different and accommodated by varying cabinets—may be logically identical. That is, all chips of each embodiment may be configured to communicate in identical topologies, whether the chips are in the FIG. 2 node arrangement or the FIG. 3A and FIG. 3B drawer arrangement. For example, SMP fabric expansion ports X, Y, Z interconnect the cards within the drawer through board 310, while ports A and B interconnect cards across different drawers. Thus, the SMP fabric topology within drawer 300 is logically identical to the fabric topology within node 200 from FIG. 2.

All chips within an oscillator domain receive the same logic oscillator. All chips of FIG. 2 or FIG. 3A and FIG. 3B may have a common Time-of-Day (TOD) oscillator, known as OSC1 if which may be the active oscillator. A second TOD oscillator or OSC2 may be the redundant oscillator. The TOD oscillator is very low frequency (on the order of 32 Mhz) relative to the logic oscillator (on the order of Ghz), so the OSC2 and OSC1 edges are easily oversampled by the logic clocks on each chip.

The processor chips within a node are connected by a synchronous coherency fabric. The separate nodes are connected by an asynchronous coherency fabric, i.e. each node may have its own logic oscillator pair sourced on the node. An additional signal, based in part on an OSC0/OSC1 pair selected as 'master', known as the TOD step-sync signal (discussed below), is distributed to all processor chips in the system with the same topology as the coherency fabric. The additional signal may be an immediate time signal which originates with one chip in one node and is distributed to the remaining chips across several nodes.

The master-slave relationship among the processor chips and nodes is established by service firmware at initial program load, which among other things, sets up various configuration registers in each processor chip. The configuration registers may exist as two different sets, indicating two alternate topologies for the SMP wherein a primary control register set organizes the nodes by one topology (e.g. using a first node and chip as a 'master') and another topology (secondary control register set) may use a second node and chip as a 'master'.

In a four node, 16 chip system, a first node may have a chip designated 'primary master'. The primary master chip may distribute a step-sync signal to the remaining 15 'slave' chips for the duration that the primary control register set maintains the topology. The embodiment may be set such that the maximum number of conductor segments that are needed to pass the step-sync of the master to the most remote of the 15 slave chips is only three. Nevertheless, each chip that receives the step-sync of the master requires a pre-programmed delay, specific to the path of the step-sync signal, prior to incrementing any local TOD or timebase register stored therein. Prior to implementing the pre-programmed delay, each step-sync signal that is either dispatched from a chip or arrives at a chip is a species of immediate time signal for the reason that the signal is transmitted fairly quickly, and perhaps as fast as practical. With reference to FIG. 4, once the signal is enhanced by, e.g. metastability circuit 461 through to the delay element 473 of each chip, the resultant time signal may be known as a delayed time signal.

The delay applied at each chip allows all timekeeping registers of each chip of the exemplary 16 chip configuration to receive each step at the same time in the form of a delayed time signal. Some small skew/jitter is present due to design tolerances and asynchronous sampling, but this skew/jitter will not accumulate. The master chip may elongate the pulse width of the TOD oscillator every 64 steps to indicate a sync cycle. Thus all slave chips also observe a sync cycle at the same time. The chosen TOD oscillator frequency in the embodiment may provide a step every 31.25 nanoseconds, and a sync every 2 microseconds.

Similarly, a second node may have a chip designated 'secondary master'. The secondary master chip may distribute a step-sync signal to the remaining 15 'slave' chips for the duration that the secondary control register set maintains the topology.

Figure 4B:
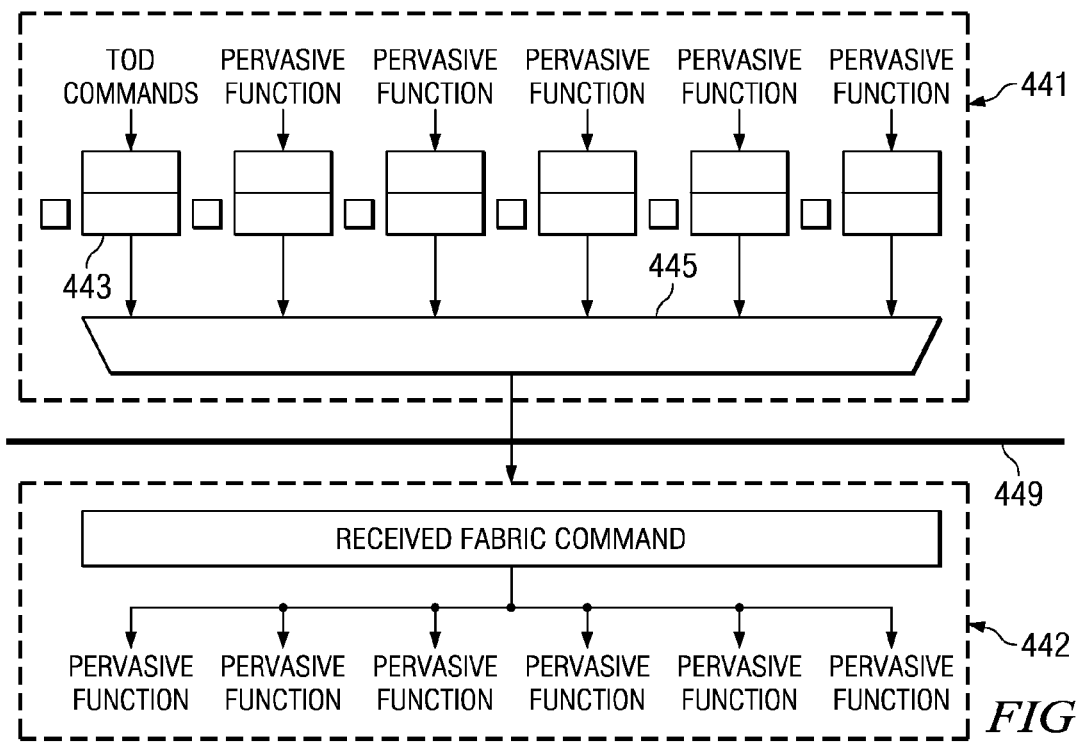
FIG. 4B shows a macro for enqueuing commands from pervasive controls for transmittal and reception of a fabric bus of a SMP in accordance with the preferred embodiment of the present invention.
Figure 4A:
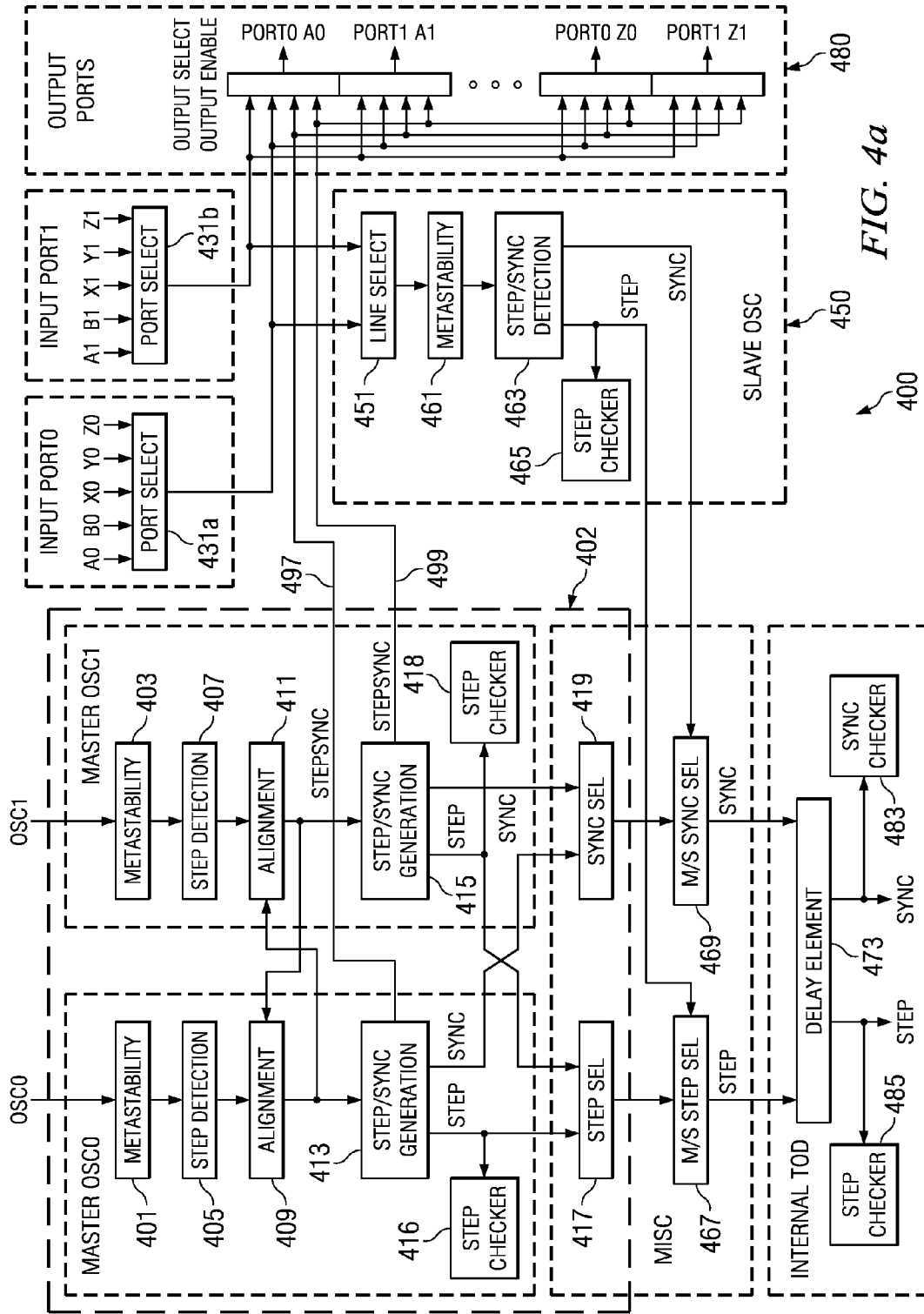
FIG. 4A shows a time of day (TOD) unit having multiple TOD oscillator inputs in accordance with the preferred embodiment of the present invention.

FIG. 4A shows the TOD unit 400, in part, within a chip, and typically implemented among the pervasive controls (see FIG. 1). Various sections of the TOD logic are active depending on the role the chip plays as a distributor of a step-sync signal, an originator of the step-sync signal, or as an end-point of a step sync signal. In the role of Master Drawer Master Time-of-day (MDMT), the redundant on-node oscillators provide the TOD oscillator to an active master oscillator path 402. Master oscillator path 402 applies metastability logic 401 and 403 to the OSC2 and OSC1 because the OSC2 and OSC1 sources have asynchronous boundary crossings as related to the internal logic oscillator of the chip.

Step detection 405 and 407 generates an internal step signal derived from the rising edge of the respective incoming TOD oscillator. Alignment logic 409 and 411 aligns the redundant TOD input (e.g. OSC1) to the actively used TOD input so that if an immediate switchover event occurred, there would be no discernable shortening or elongation of a pulse. Alignment may be required since the OSC2 and OSC1 are very close to the same frequency within a few parts-per-million (ppm), but independent, and likely to drift over time.

Step-sync logic 413 and 415 may generate a step signal every 31.25 nanoseconds and a sync signal every 2 microseconds. Internal to the chip, the step signal follows a path independent from the sync signal; however, the signals may be added together for transmittal inter-chip as a step-sync signal over output select ports A, B, X, Y and Z 480. Thus first step-sync signal 497 based on OSC2 may be distributed, and second step-sync signal 499 based on OSC1 may be distributed. Output select will select either first step-sync signal 497 or second step-sync signal 499 and may distribute one of those signals to each of the ports x, y, and z among chips on the same drawer, and to each of the ports a and b to chips not in the same drawer. Each port may further be subdivided into a primary port and a secondary port to provide redundancy in case on or the other ports fail. Line select 451 on a slave chip receiving the signals may then select which among the primary and secondary ports has a good circuit in case of failure of one.

Step checker logic 416 and redundant step checker 418 may detect a failure of an incoming TOD oscillator signal to be within tolerated limits. The step checker logic may count the number of internal processor cycles for every step signal that originates in step-sync generator 413 and 415. If the number cycles varies from a preprogrammed number based on the operating frequency of the processor, the respective step checker will provide an error indication, e.g. to firmware or control logic. For example, a processor with an internal clock frequency of 2 Ghz (0.5 ns clock period) would expect on average 62.5 processor cycles between steps. To allow for some amount of jitter, the step checker is preprogrammed to allow a reasonable range, such as from 60 to 64 cycles between steps.

The final processing step in the master oscillator path 402 is the selection of a valid step signal and a valid sync signal. In effect, step selector 417 and sync selector 419 select whether OSC2 will be the basis for the internal step signal and sync signal, or whether OSC1 will be the basis for them within the MDMT. The step checker 416 makes a determination that TOD oscillator zero (OSC0) is a valid oscillator, or in the case the step-sync generation fails to meet a signal criterion, that TOD oscillator one (OSC1) is a valid oscillator. Thus, in the case of a 2 Ghz processor frequency with a 32 Mhz TOD oscillator, the discovery of less than 60 or greater than 64 processor cycles between step pulses would be failing to meet the signal criterion that between 60 and 64 processor cycles occur between step pulses. As may be appreciated, the signal criterion may be pre-set to be other than 60 to 64 cycles per step to accommodate a range of processor internal clock frequencies and TOD oscillator frequencies. Other signal integrity checking techniques may also be employed such as frequency drift detection.

In slave oscillator path 450, line select 451 will select the input port0, or the input port1. Input port0 and input port1 are simply redundant copies of the step-sync signal driven from a neighboring chip, originating from the MDMT chip. Because off-chip and off-node connections are prone to defects, every segment of the step-sync topology is redundant. The selection of port0 or port1 may be established in the primary control register set, and an alternate selection established in the secondary control register set. The selected input flows through metastability logic 461 before feeding step-sync detection logic 463 which analyzes the pulse width of the incoming step-sync signal to determine and generate separate step and sync signals. A step checker 465 validates the integrity of the selected input port0 or port1 step-sync signal, similar to step checkers 416 and 418 in the master OSC path, and if it does not meet the signal criterion will provide an error indication, e.g. to firmware or control logic.

Differentiation of the role a chip is to play is established in master/slave step selector 467 and master-slave sync selector 469. The master/slave step selector operates to select master oscillator path in tandem with master/slave sync selector 469, such that both select master oscillator path 402 in unison, or select the slave oscillator path 450 in unison. For the chip that is MDMT, the master oscillator path 402 is selected, and there are no intervening segments to distribute the step-sync signal to incrementers that store the TOD register value and the timebase register values for each processor core of the chip. The chip designated as master will forward the selected master OSC step-sync signal to all output ports 480 for redundant distribution to all neighboring chips. Chips designated as slaves will forward selected input port 431 to all output ports for redundant distribution to all neighboring chips. The selection of master role or slave role for each chip may be established in the primary control register set, and an alternate selection established in the secondary control register set.

In the preferred embodiment, it is always possible to assign the topology such that a slave chip does not need to re-drive the step-sync signal on the same fabric port that it receives it on. Therefore, output ports 480 and input ports 431a and 431b may be implemented as redundant bi-directional signals rather than redundant pairs of drivers/receivers in order to save chip pins and connections.

Delay element 473 compensates for the fixed delay values in the system of chips. In the MDMT, the lack of intervening segments causes the step signaling to arrive most promptly to the TOD register and timebase as compared to the 15 slave chips of MDMT. Thus, to establish a uniform front of step edges at the collective outputs of the collective delay elements 273 (of chips within a OSC domain), the programmable delay is longest at the MDMT to permit the other step signals of other chips to 'catch up'. Slave chips which are closer (in terms of propagation delay) to the MDMT will have longer delay values, and slave chips which are farther away will have shorter delay values. Slave chips which do not directly neighbor the MDMT chip will receive the step-sync signal already somewhat delayed on input ports 431 from a slave chip which was closer to the MDMT chip. The delay value may be established in the primary control register set, and an alternate value established in the secondary control register set.

The step and sync signals output from delay element 473 are checked to ensure they meet the signal criterion. Step checker 485 uses the same criterion as step checkers 416, 418, and 465. Sync checker 483 verifies that the correct number of step indications were received for every sync indication. With a step frequency of 32 Mhz and a sync frequency of 2 microseconds, the logic ensures that there is always 64 steps for every sync, otherwise it provides an error indication, e.g. to firmware or control logic.

Outputs from delay elements 473 are handled as follows. While a chip finite state machine (FSM) is operating in a 'running' state (and producing a 'running indication'), the step signal drives three local registers: a TOD register that may be 60 bits wide (the bits allocated with precision limited to the frequency of the TOD oscillator.) a processor core0 timebase register (64 bits where bit(59) corresponds to the same granularity of the TOD register); and a processor core1 timebase register. Synchronizing within a single chip occurs in two stages. First, the TOD register is set, and once running, then two or more timebase registers are set, e.g. at or during a sync signal. A timebase register has a sense/control path to the TOD register. After loading the time value into the timebase register at a sync signal, the timebase is incremented by a step signal.

Since a chip may be placed in active service while other chips are already running with a synchronized timebase, various methods are necessary to load and distribute a timebase among a chip or chips of a node as it is installed or corrected for errors. Commands and values are passed from chip to chip using the existing SMP coherency fabric. In a preferred embodiment, the coherency fabric protocol uses multiple "beats" across multiple cycles to save chip pins and wires relative to using a bus structure wide enough to transmit all command, address, and data in a single cycle. Commands from TOD unit 400, use a subset of the existing supported coherency fabric protocols, and are split into multiple beats consisting of the command itself, called a transaction type (TTYPE), data, and check bits for error detection.

FIG. 4B shows a pervasive command interface or pervasive control to the fabric bus of the symmetric multiprocessor system. Such a pervasive control may, for example transmit a MDMT TOD register value as part of the distribution process of TOD values. A macro or send block 441 may be active in transmitting a TOD command, which may include a TOD register value. The macro may also be known as tp_fbc_snd_pmc. The send block 441 may have two deep-queue 443 for accepting commands for later dispatch along the fabric bus 449. Additional pervasive functions may have respective queues 443b, 443c, 443d, 443e and 443f, for staging commands concerning In-memory trace (HTM) global triggering, trace array global triggering, and IO hotplug pervasive commands, among others. A macro or receive block 442 also known as, tp_fbc_rcv_pmc, may exist on the chip to receive such pervasive commands as well.

Associated with two-deep queue 443 may be a valid bit 444 to indicate to a command arbiter that a command is available. When a valid command is in the command queue a request may be sent to the fabric 449 that a command is waiting to be sent. The fabric 449 will respond with a request sent signal and the command is placed into the fabric pipeline.

Each chip has a tp_fbc_rcv_pmc macro or receive block 442 that snoops the fabric line for commands that are broadcast or point-to-point addressed to the chip hosting the receive block.

Figure 5A:
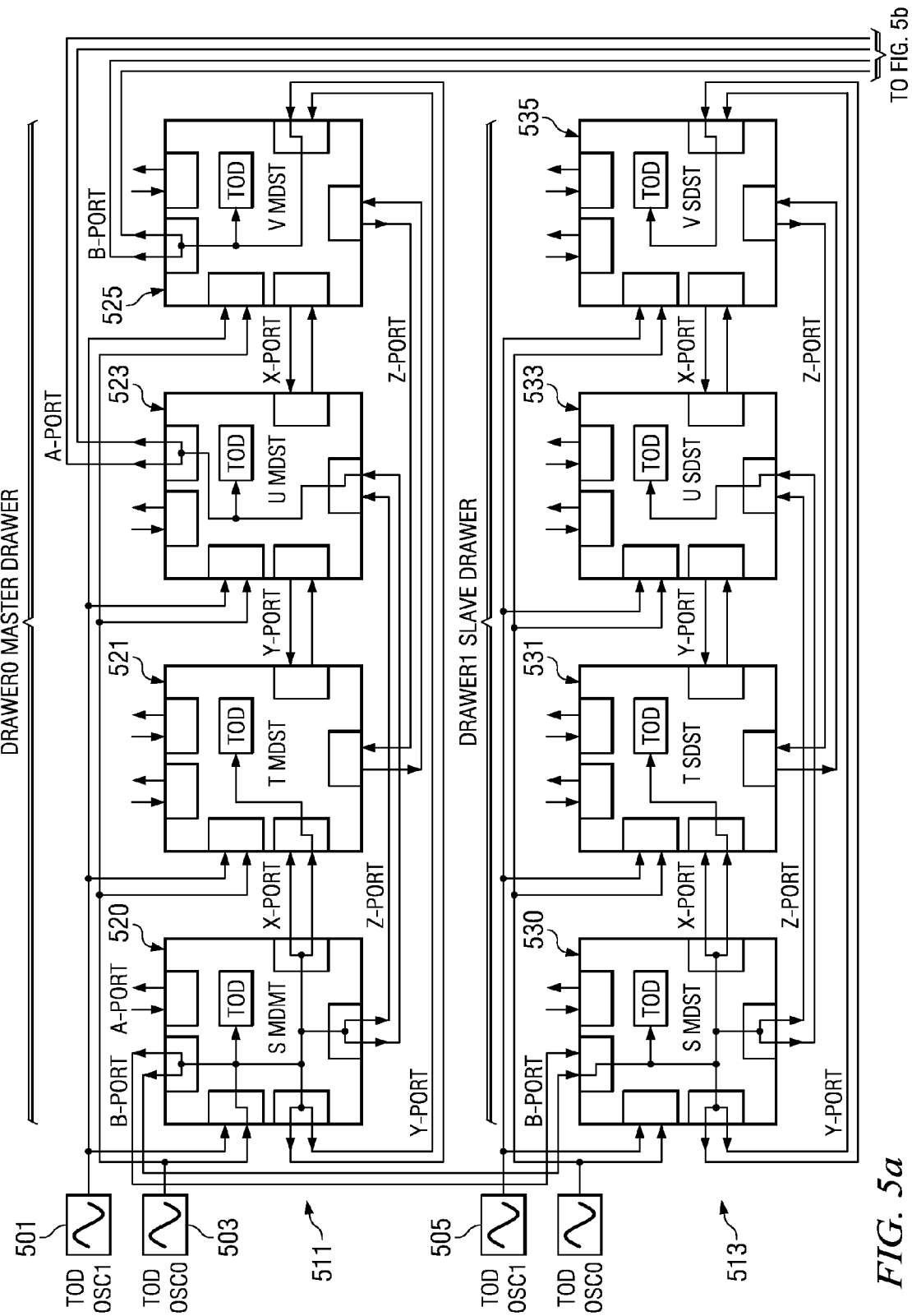
FIG. 5A shows a first half of a logical configuration of multi-processor chips showing the generation and distribution of immediate time signals in accordance with the preferred embodiment of the present invention.
Figure 5B:
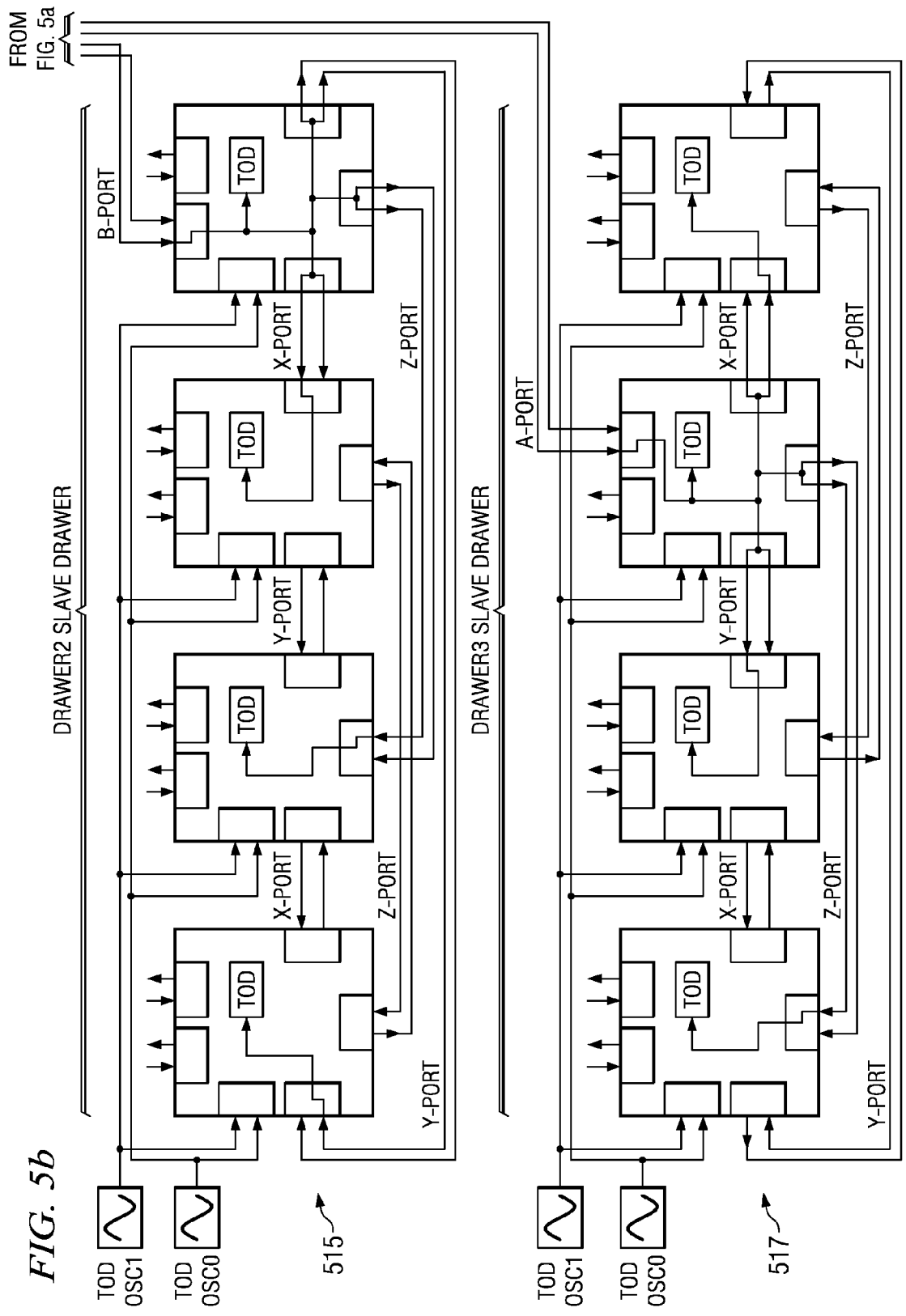
FIG. 5B shows a second half of a logical configuration of multi-processor chips showing the generation and distribution of immediate time signals in accordance with the preferred embodiment of the present invention.

Since a TOD command is a broadcast command, and the point-to-point bits are unused for it specifically, there is a possibility for adding a point-to-point or other command to form a multiplexed command, which may be accomplished in multiplexer 445. FIG. 5A and FIG. 5B shows a possible logical topology among the timing circuits of each chip. FIG. 5A and FIG. 5B represents the interconnects among four drawers, each containing four chips and two oscillators. The drawers are drawer0 511, drawer1 513, drawer2 515 and drawer3 517. Among the collective drawers there may be 16 chips which may configured, using the primary control register set, as one Master Drawer Master TOD (MDMT) chip 520, and 15 slave chips. Master Drawer Slave TOD (MDST) chips are slave chips in the same drawer as the MDMT chip 521, 523, 525. Chips in slave drawers which receive the step-sync signal from a chip in a different drawer are considered Slave Drawer Master TOD (SDMT) chips. All other slave chips (receive step-sync signal from another slave in same drawer) are Slave Drawer Slave TOD (SDST) chips. The MDMT 520 generates a pair of step-sync signals as described, which may or may not be valid at the output ports, depending on the resilience of the driving TOD OSC0 503 and TOD OSC1 501, as well as the interconnects and circuits of MDMT 520. Thus to counter potential problems with validity, each port of MDMT 520 is capable of providing a step-sync derived from TOD OSC2 or a step-sync derived from TOD OSC1. The x-port of MDMT 520 may be connected to the x-port of MDST 521. The z-port of MDMT 520 may be connected to the z-port of MDST 523, and the y-port of MDMT 520 may be connected to the y-port of MDST 525.

Thus the MDMT 520 may be commanded by firmware, or upon power-up to start providing routine step-sync signals and occasional TOD values, while MDST 521, MDST 523 and MDST 525 wait for such signals to be transmitted to them, at least initially.

Further distribution of the step-sync may occur by dispatching the step-sync (both primary and secondary) to other drawers. MDMT 520 B-port may transmit step-sync to SDMT 530, whereby SDMT 530 further distributes to remaining chips (SDST) in drawer1 513 from ports y-port, x-port, and z-port of SDMT 530. In similar fashion, MDST 523 transmits step-sync from its a-port to drawer3 517, and MDST 525 transmits step-sync from its b-port to drawer2 515. The SDMT chips in drawer2 and drawer3 similarly distribute step-sync to the remaining SDST chips in same drawer.

Upon receipt of a "send TOD value" command, from e.g. firmware, the TOD register value that may first become valid in MDMT 520, also known as MDMT TOD register value, may be broadcast via the SMP fabric bus, for availability to each of the 15 slave processors.

Initialization of the hardware configuration of FIG. 5A and FIG. 5B occurs as follows. A TOD register for each chip may receive its data via the fabric ports at varying times. However the bandwidth of data that arrives may be on the order of 60 bits. In contrast, the step-sync signals, once issued from the delay block of each chip, arrive synchronously to the TOD and timebase registers of each chip. Among the purposes of the sync portion of the signal is to inform each chip that the timebase registers may now copy the contents of the local TOD register to the timebase registers themselves, if the local TOD register is in the running state, and nearly simultaneously arrive at the same timebase for all running cores.

A boundary may be a transition of a signal from a high to a low value, or from a low to a high value, but not both. The choice of making a boundary being the former or the latter, is up to the system designer. When passing the TOD value from a MDMT chip to a slave chip, the MDMT chip waits for a 4 microsecond boundary which occurs on every second sync boundary, and corresponds to bit 52 of the TOD. At the 4 microsecond boundary, bits 53:63 of all the timebase registers in the system should be zeros, and the MDMT sends the TOD register value on the fabric. The fabric design in the preferred embodiment guarantees that every chip will receive the command within 2 microseconds. All slave chips that are not already in a TOD running state capture the value received on the fabric, but turn on bit 53. This value is held (not incremented) until the next 2 microsecond sync pulse arrives, then incrementing continues with the step pulse. Since the bit corresponding to 2 microsecond is turned on and the value paused, and all chips see the 2 microsecond sync at the same time, the TOD values are all synchronized to each other. This is like calling a time service where it says, "At the tone, the time will be xx o'clock . . . beep".

Figure 6:
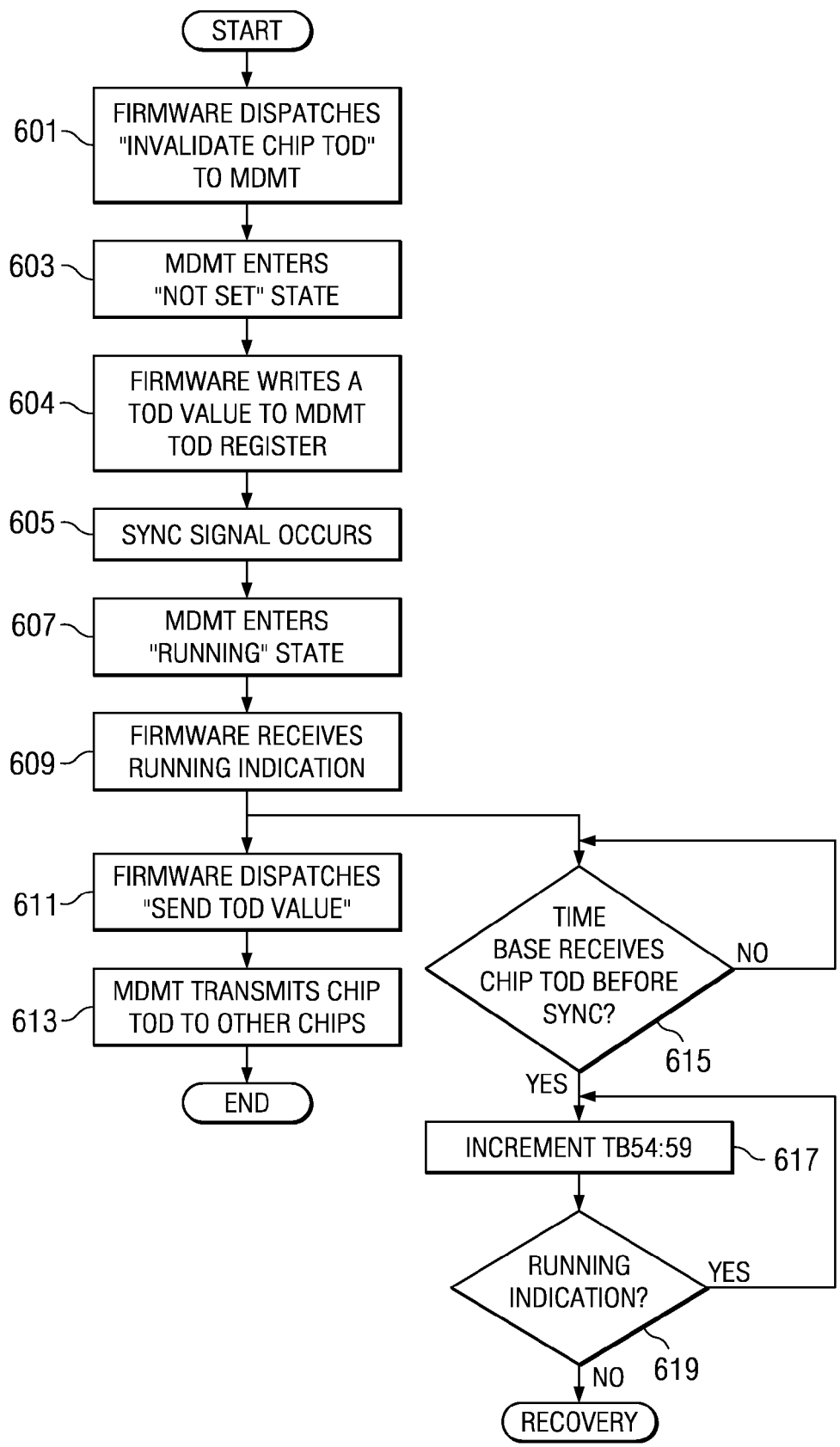
FIG. 6 shows a flow diagram of the steps used to start a finite state machine of a Master Drawer Master TOD chip up to an including the incrementing of a timebase in accordance with the preferred embodiment of the present invention.

Thus, at the outset, all chip TOD finite state machines (FSM) are in an error state. FIG. 6 depicts the initialization as viewed at a MDMT. Firmware may issue a TOD #5 command which moves all chip FSMs in the system from error state to "not set" state. Such a command may occur on a sync boundary, and may, in essence, prepare a chip to receive a TOD register value. A chip designated as MDMT by, e.g. the primary control register set, may receive the "invalidate chip TOD" command (step 601). MDMT enters a "not set" state (step 603) and marks the TOD register as not valid. Firmware may write a TOD value to MDMT (step 604) and the MDMT enters a "wait for sync" state. The MDMT starts generating steps at the next sync boundary and generates a sync signal at the preprogrammed interval (perhaps a preprogrammed 64), as well as any hybrid step-sync signals to its configured output ports. The occurrence of the sync (step 605) places the MDMT into a running state, and a running indication is set (step 607). Firmware receives the running indication (step 609). At this time, the MDMT is the only chip that is running. The TOD register increments upon getting each locally generated step signal from the local delay element 473 of FIG. 4A.

Firmware may dispatch a "send TOD value" command to MDMT (step 611). The MDMT waits for an appropriate boundary of the now-incrementing TOD (e.g. a 4 microsecond boundary) and then broadcasts the TOD value to other chips (step 613). This enables the slave chips to have a copy of the data that the MDMT has. Operation of the MDMT ends as related to initializing itself and issuing initializing commands to the slave chips. Nevertheless, the MDMT FSM remains in a "running" state, and may transition to other states upon receiving commands from firmware, commands from other functional units or errors.

All remaining chips that are in the "not set" state receive the TOD. It should be fairly easy for hardware to deliver the TOD in under 2 microseconds. Each local chip stores the TOD value received into its local TOD register, turns on the bit corresponding to the 2 microsecond sync, and may zero out lower significant bits if the TOD received has fewer bits than the local TOD register holds. Local chip advances to "wait for sync" state.

Once a TOD "running" state has been achieved, the timebase registers in the processor cores are loaded with the value from the chip TOD register (step 615). At a 2 microsecond sync boundary, it is known that the low-order bits (54:59) of the TOD, and hence the timebase should be zeros. The sense/control interface associated with the timebase waits for a 2 microsecond sync boundary, then clears the value in the timebase register and senses the value from the chip TOD register. The sense is guaranteed to be much faster than 2 microseconds, because the timebase and TOD are on the same chip. While waiting for the sensed TOD value, the timebase continues incrementing at bit(59) on every step pulse (step 619). When the TOD value is returned, bits 0:53 are written to bits 0:53 of the timebase register. Since the sense was started with bits 54:59 equal to zero, and the sense is fast, it is guaranteed that the incrementing timebase value will not carry into bit 54 before the value is received from the TOD register, so the timebase register and TOD register remain in sync with each other.

As long as the chip FSM has a running indication (step 619), incrementing will continue. If the chip stops running (step 619), a negative branch is taken and some recovery may be performed.

A chip may drop the running indication for a number of different reasons. A firmware may command the chip to enter the "not set" state. An error may occur. When an error occurs, e.g. a soft failure shown by a parity error, the pervasive controls may set the chip FSM to an "error" state. The chip drops the running indication and invalidates the timebase counters for each resident core. Firmware may read the reason for the chip is no longer running using the sense/control path. If possible, the firmware may restore the appropriate register if it is a control register that failed.

The firmware may resynchronize the chip TOD register in the "error" state chip as follows. Firmware may command, via a TOD command #5, that the chip enter the "not set" state. Firmware may follow with a TOD command #3, which is a control command broadcast to all chips over the fabric bus to "request TOD value". Every chip that is in a "running" state, in response to the request TOD value, may transmit its locally stored TOD register value over the SMP fabric bus at the next 4 microsecond boundary using TOD command #4 "Send TOD". The chip or chips that are in the "not set" state transition to "wait for sync" upon getting the first received "Send TOD command" on the fabric. In addition the chip loads its chip TOD register with the contents of "Send TOD command" while also turning on the bit corresponding to the 2 microsecond sync boundary. The TOD value is not incremented while in the "wait for sync" state, and when the next 2 microsecond sync signal is received the chip TOD FSM transitions to running and resumes incrementing with further step signals, synchronized with the other TOD values in the system, and forwards the step and sync signals to the timebase register. When firmware observes the TOD running state, it then initiates the timebase register to load the value from the chip TOD at the next 2 microsecond sync interval. The timebase register then resumes incrementing as disclosed above from the step signal received through the delay element of the chip recovering from the error.

A failure of a master oscillator path (OSC2 or OSC1) in a MDMT or of a non-redundant but actively used TOD oscillator in a multi-drawer SMP may be recovered from as follows. FIG. 5A and FIG. 5B may show the configuration of the system just prior to the failure occurring. The logical configuration may be set by a primary control register set. The secondary control register set of every chip pervasive control holds a backup configuration for the system, which is different to the primary configuration set. For example, the secondary control register set could assign the MDMT role to chip T 531 of drawer1 513 with TOD OSC1 505 as active. Note that additional connections from newly assigned master drawer to the other drawers must be present, but are not shown in FIG. 5A and FIG. 5B to reduce clutter.

During runtime, just one of the two control register sets is active. An error may occur prior to switchover wherein the selected master OSC path detects a missing step signal via the step checker logic 416 of FIG. 4. A local pervasive control may invalidate the local chip TOD register, i.e. TOD register of the current MDMT 520. To stem the flow of invalid signaling, output select gates 480 (of FIG. 4) may gate off the step-sync signals that are leaving the chip. This invalidates all chip TOD registers in the system except the one TOD chip in the system which is the MDMT for the secondary control register set, i.e. chip T 531 in our example. This chip, which may also detect a step check error in its slave oscillator path 450, switches from its internal slave path 450 to the master TOD oscillator path 402. Logic in the master TOD oscillator path understands that a momentary "pulse width" disruption of the selected oscillator during the switch is possible, and suppresses the associated error detection, as the expected disruption will not propagate to the other chips. This one chip TOD register continues to increment from the selected OSC1 505 of drawer1. Chip T 531, may observe a brief timeout to confirm that its input ports 431a, 431b continue to receive invalid signals. Firmware may issue a TOD command #1 "switch between primary and secondary register set without sync alignment" via the sense control interface which is broadcast over the fabric bus. Every chip then may activate its configuration designated by the secondary control register set, however the switchover may occur at different times on each chip. Thus a brief timeout period may be observed to allow the input ports, output ports and various selectors to settle into their new roles. Chip T 531, which now acts as MDMT may broadcast TOD command #2 "enable step checkers" command, since chip T 531 is already generating step-sync signals, and the ports are routed to propagate such signals, and the delay elements are updated to maintain delay compensation. Synchronization of the TOD values on all the slave chips is then performed as previously described for the parity error condition, but from the newly assigned MDMT chip in accordance with the assignments of the secondary control register set.

It may be required to perform maintenance on the drawer which contains the MDMT chip. Since this maintenance is predicted, unlike unexpected error conditions, it is possible to invoke the various redundancy with less disruption to the system. For example, if the active TOD oscillator must be replaced (e.g. due to failure of an unrelated component on the same card), firmware can write a control register bit in the MDMT chip via the sense/control interface to "switch to alternate TOD oscillator with sync alignment". Alignment logic 409 and 411 from FIG. 4a indicates to step select 417, sync select 419, and output select 480 when the incoming oscillator signals are aligned such that the alternate source may be selected without disruption of the step-sync signals, so all TOD and timebase registers remain running.

In other cases the entire master drawer may need to be removed for maintenance of an unrelated component. In order to remove the master drawer, the topology must be re-assigned according to the alternate control register settings. Firmware may issue a TOD command #0 "switch between primary and secondary register set with sync alignment". Since this is a predicted event, the switch does not have to happen immediately, but can wait until a 2 microsecond sync boundary. The TOD command #0, like the TOD command #5 cause many slave chips to enter the "not set" state—and thus both commands are commands that prepare a chip to receive a TOD register value. All chips in the system see the broadcast command on the fabric, and prepare for a switch to the secondary control register settings at the next sync. Instead of going to error state, as in the unpredicted failure case, all the chip TOD FSMs except the alternate MDMT temporarily go to the not-set state. Since the switch is performed predictively at a 2 microsecond sync boundary, all chips switch at the time. The newly assigned MDMT then automatically issues TOD command #4 "Send TOD Value" at the 4 microsecond boundary after the switch, and all slave TODs synchronize to the new value as described earlier and return to the running state. The timebase registers are then synchronized to the chip TOD registers as described earlier.

It should be appreciated that the step-sync signal may be expanded to two independent signals if off-chip pads and conductors are not a big concern, and thus such configurations of an off-chip step signal segment and a off-chip sync signal segment are considered equivalent to a multiplexed step-sync signal.

It should also be appreciated that multiple redundant paths are available in addition to the examples presented, which can be selected by firmware which understands the topology of the system. For example, low-end systems where cost reduction is a priority may avoid using multiple TOD oscillators in each drawer, or even restrict to a single oscillator in a single drawer. Alternate control register settings could simply select different X, Y, Z port0 or port1 slave ports, but not re-assign the MDMT chip.

Among the sought for benefits of one or more embodiments is providing a common time of day to all chips in an asynchronous manner, and then applying the time of day to an internal timebase register of all chips by accounting for propagation delays in a command and clock distribution network. The disparate timebase registers may be operated in counter fashion by using independent logic clocks and still stay within a reasonable tolerance of other timebase registers in other chips.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A time of day circuit for distributing a synchronized timebase from a first chip to a second chip and maintaining synchronization timebase operation in a symmetrical multiprocessing system having a fabric bus comprising the steps of:
   a metastability circuit for aligning a valid oscillator signal with a local logic oscillator of the first chip;
   a second metastability circuit for aligning a second oscillator signal with the local oscillator of the first chip;
   a selector and step checker for determining that the valid oscillator signal satisfies a signal criterion;
   a step-sync generator for generating an immediate time signal based on the valid oscillator signal;
   a pervasive control for transmitting via the fabric bus, a TOD register value to the second chip;
   a delay element for delaying the immediate time signal by a preprogrammed delay to produce a delayed time signal; and
   means for incrementing at least one timebase according to the delayed time signal.

2. The time of day circuit for distributing a synchronized timebase of claim 1 further comprising:
   a step-sync generator for generating a second immediate time signal based on the second oscillator signal; and
   a means for transmitting the second immediate time signal to the second chip.

3. The time of day circuit for distributing a synchronized timebase of claim 2 further comprising:
   a means for configuring an output port to connect to a chip based on a primary control register set.

4. The time of day circuit for distributing a synchronized timebase of claim 1 further comprising:
   means for loading the TOD register value into the at least one timebase on the second chip.

5. The time of day circuit for distributing a synchronized timebase of claim 1 further comprising:
   means for transmitting a prepare command from the first chip to the second chip; and
   means for transmitting a TOD register value from the first chip to the second chip.

6. The time of day circuit for distributing a synchronized timebase of claim 5, wherein the means for transmitting a prepare command and transmitting a TOD register value happen on a sync boundary.

7. The time of day circuit for distributing a synchronized timebase of claim 6, wherein the sync boundary is delayed by a programmable delay.

8. The time of day circuit for distributing a synchronized timebase of claim 1 wherein the step-sync generator generates an immediate time signal to a primary port to the second chip and to a secondary port to the second chip.

* * * * *